United States Patent
Ebrahimi Afrouzi et al.

(10) Patent No.: US 10,762,186 B1
(45) Date of Patent: *Sep. 1, 2020

(54) METHOD FOR ROBOTIC DEVICES TO AUTHENTICATE USERS

(71) Applicants: Ali Ebrahimi Afrouzi, San Jose, CA (US); Amin Ebrahimi Afrouzi, Berkeley, CA (US); Masih Ebrahimi Afrouzi, Berkeley, CA (US); Soroush Mehrnia, Soeborg (DK); Azadeh Afshar Bakooshli, San Jose, CA (US)

(72) Inventors: Ali Ebrahimi Afrouzi, San Jose, CA (US); Amin Ebrahimi Afrouzi, Berkeley, CA (US); Masih Ebrahimi Afrouzi, Berkeley, CA (US); Soroush Mehrnia, Soeborg (DK); Azadeh Afshar Bakooshli, San Jose, CA (US)

(73) Assignee: AI Incorporated, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/221,425

(22) Filed: Dec. 14, 2018

Related U.S. Application Data

(63) Continuation-in-part of application No. 14/820,505, filed on Aug. 6, 2015, now Pat. No. 10,185,815.

(60) Provisional application No. 62/041,113, filed on Aug. 24, 2014.

(51) Int. Cl.
G06F 21/32 (2013.01)
G06K 9/00 (2006.01)

(52) U.S. Cl.
CPC ......... *G06F 21/32* (2013.01); *G06K 9/00926* (2013.01); *G06K 9/00087* (2013.01); *G06K 9/00288* (2013.01); *G06K 9/00617* (2013.01); *G06K 9/00885* (2013.01); *G06K 2009/00932* (2013.01)

(58) Field of Classification Search
CPC ................ G06F 21/32; G06K 9/00926; G06K 2009/00932; G06K 9/00087; G06K 9/00885; G06K 9/00288; G06K 9/00617
See application file for complete search history.

(56) References Cited

U.S. PATENT DOCUMENTS

| | | | |
|---|---|---|---|
| 5,845,733 | A | 12/1998 | Wolfsen |
| 6,078,265 | A | 6/2000 | Bonder et al. |
| 7,024,564 | B2 | 4/2006 | Pavlin et al. |
| 7,729,518 | B2 | 6/2010 | Awatsu et al. |
| 9,908,239 | B1 | 3/2018 | O'Brien et al. |

(Continued)

*Primary Examiner* — Michael Pyzocha

(57) ABSTRACT

Provided is a method for establishing and maintaining a user loyalty metric to accesses a plurality of robotic device functions including: receiving biometric data associated with a user; authenticating the user; providing a time access memory, wherein the time access memory comprises a plurality of memory cells; assigning a predetermined time slot to each of the plurality of memory cells, wherein each of the plurality of memory cells is available for writing only during the predetermined time slot, after which each memory cell is made read-only; storing the biometric data of the user if the user is authenticated within a currently available memory cell of the time access memory; increasing the user loyalty metric if the user is authenticated; and, providing access to the plurality of robotic device functions in accordance with the user loyalty metric.

20 Claims, 5 Drawing Sheets

(56) References Cited

U.S. PATENT DOCUMENTS

| | | |
|---|---|---|
| 2002/0120362 A1* | 8/2002 | Lathan .................. A63F 13/00 700/245 |
| 2005/0226468 A1 | 10/2005 | Deshpande et al. |
| 2006/0036873 A1 | 2/2006 | Ho et al. |
| 2008/0025118 A1 | 1/2008 | Scheuerlein |
| 2009/0199264 A1 | 8/2009 | Lang |
| 2010/0234995 A1 | 9/2010 | Zini et al. |
| 2011/0063094 A1 | 3/2011 | Meiertoberens et al. |
| 2013/0182716 A1 | 7/2013 | Gemelli et al. |
| 2014/0041008 A1 | 2/2014 | Roskind et al. |
| 2015/0013000 A1 | 1/2015 | Linnakangas et al. |
| 2015/0242605 A1 | 8/2015 | Du et al. |
| 2015/0273704 A1 | 10/2015 | Inaba |
| 2015/0347734 A1 | 12/2015 | Beigi |
| 2016/0354165 A1 | 12/2016 | Uenoyama et al. |
| 2017/0149725 A1 | 5/2017 | Kuriyama |

* cited by examiner

| Function | Minimum Loyalty Metric |
|---|---|
| Speed 2 | 25 |
| Speed 3 | 35 |
| Speech | 35 |
| Surveillance Camera | 60 |
| Record Audio | 65 |
| Run Algorithm A | 70 |
| Add New User | 90 |

METHOD FOR ROBOTIC DEVICES TO AUTHENTICATE USERS

CROSS-REFERENCE TO RELATED APPLICATIONS

This is a continuation-in-part of U.S. patent application Ser. No. 14/820,505 filed Aug. 6, 2015 which is a Non-Provisional Patent Application of U.S. Provisional Patent Application No. 62/041,113 filed Aug. 24, 2014, all of which are herein incorporated by reference.

FIELD

The present invention relates to robotic devices. More particularly, the invention relates to a method for robotic devices to accurately authenticate one or more users.

BACKGROUND

As robots and electronic computing devices are increasingly used for important and sensitive purposes, authentication methods have become more and more critical. Lock and key systems are a traditional form of protecting information. As technology advanced, digital passwords were introduced. In U.S. Pat. No. 6,078,265 (Nettel Technologies, Inc.), fingerprint readers were introduced which utilized the user's fingerprint instead of a key to access information. In U.S. Pat. No. 5,845,733 (Adam Wolfsen), human retina scanning was proposed.

In prior art, extensive effort has been put toward advancing authentication systems, but all of the described methods worked by opening the system with a more complex method. If an intruder were to somehow overcome the security system, he could then easily change the privileges and grant himself the clearance needed for access to the information. Although these solutions advanced authorization technology, if they are bypassed, the rest of the system becomes vulnerable. A need exists for a method to secure information that cannot be bypassed, overridden, overcome or hacked. A need exists for a method for electronic computing devices to reliably identify users, the method which cannot be maliciously changed by intruders.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Some aspects include a method for establishing and maintaining a user loyalty metric to accesses a plurality of robotic device functions including: receiving biometric data associated with a user; authenticating the user; providing a time access memory, wherein the time access memory comprises a plurality of memory cells; assigning a predetermined time slot to each of the plurality of memory cells, wherein each of the plurality of memory cells is available for writing only during the predetermined time slot, after which each memory cell is made read-only; storing the biometric data of the user if the user is authenticated within a currently available memory cell of the time access memory; increasing the user loyalty metric if the user is authenticated; and, providing access to the plurality of robotic device functions in accordance with the user loyalty metric.

Some aspects include an apparatus, including: a robotic device including: a chassis; drive wheels coupled to the chassis; one or more processing units; one or more sensors; one or more biometric sensors; a time access memory comprising a plurality of memory cells; and, one or more tangible, non-transitory, machine-readable medium storing instructions that when executed by the one or more processing units effectuate the above described operations.

Some aspects include one or more tangible, non-transitory, machine-readable medium storing instructions that when executed by the one or more processing units effectuate the above described operations.

BRIEF DESCRIPTION OF DRAWINGS

FIG. 4 shows a sample table of loyalty metrics required for different functions of a robot.

DETAILED DESCRIPTION OF SOME EMBODIMENTS

The present invention will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present inventions may be practiced without some or all of these specific details. In other instances, well known process steps and/or structures have not been described in detail in order to not unnecessarily obscure the present inventions. Further, it should be emphasized that several inventions are described, and embodiments are not limited to systems implementing all of those inventions, as various cost and engineering trade offs may warrant systems that only afford a subset of the benefits described herein or that will be apparent to one of ordinary skill in the art.

Briefly, the system works by scanning and storing one or more biometric features of users, which are used to identify the users. In some embodiments, a fingerprint, palm print or the hand blood vessel parameters may be scanned with a biometric scanner within the device. In other embodiments, other biometric measures such as retinal scans, voice and facial recognition, hand writing recognition, and DNA recognition may be taken by the device. In some embodiments, during an initial set-up period, authorized users are identified to the system using the biometric scanner. A biometric profile of each authorized user is saved in a database. In some embodiments, each authorized user begins with an initial loyalty metric stored in a loyalty index. Anytime a user is authenticated by matching a biometric scan with one of the saved biometric profiles, that user's loyalty metric may be increased. The device's various functions may be operable to users based on their loyalty metrics. In some embodiments, the loyalty levels required for different functions may be configured by users during set-up so that the authorized user or users can decide which functions are accessible to users based on their loyalty metric.

In some embodiments, a minimum time interval between scans is imposed to prevent the system from being circumvented by malicious attacks. For example, the system may be set up so that it accepts only one scan action within a preset time period. Thus, an intruder would not be able to establish a high loyalty metric over a short period of time in order to gain full access to the system.

Figure 1:
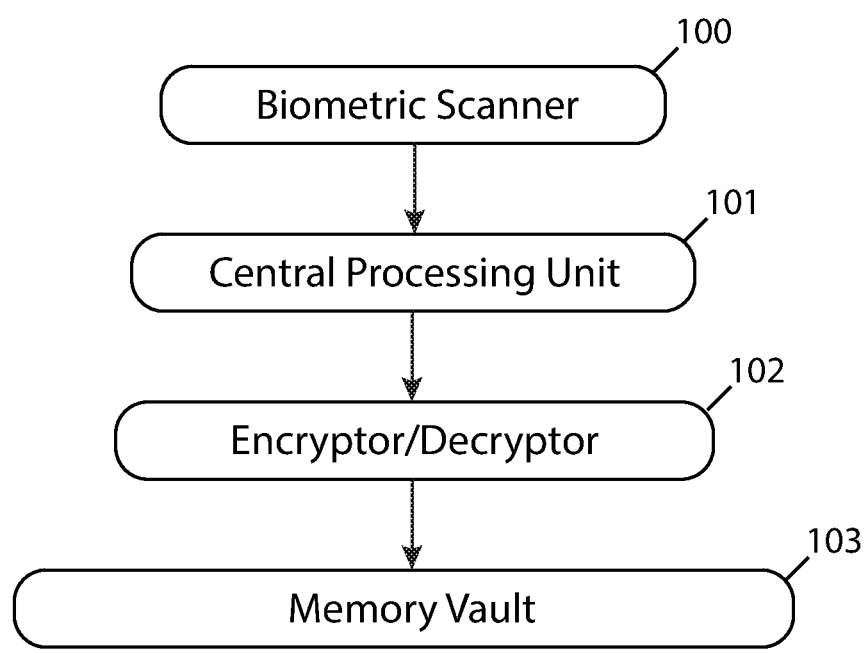
FIG. 1 depicts the hardware subsystems in the proposed invention.

FIG. 1 illustrates an embodiment of the process of receiving and storing biometric data. The biometric scanner 100 registers user input and sends data to a central processing unit 101. In some embodiments, the central processing unit uses an encryptor/decryptor subsystem 102 to encrypt the data for further protection. Data is then stored in a memory vault 103.

A new type of memory storage, referred to as Time Access Memory (TAM) is proposed in the present invention. Unlike currently available memory types, TAM is a form of read-only memory in which memory cells are associated with successive time slots. In some embodiments, each memory cell is usable only within its time slot, after which point the memory cell, if not used, is permanently filled with junk data or other unusable data and becomes unwritable. The next memory cell becomes active in the next time slot, and may be filled only during that time slot. As the process continues, memory cells are either written with data during the time slot, or filled with junk data. Either way, memory cells whose time slots have passed are unchangeable. In some embodiments, data of memory cells corresponding with times lots that have passed are stored in another memory, an external device and/or on the cloud. In some embodiments, data of memory cells corresponding with time slots prior to a certain time point are discarded. In some embodiments, junk data is discarded.

Figure 2:
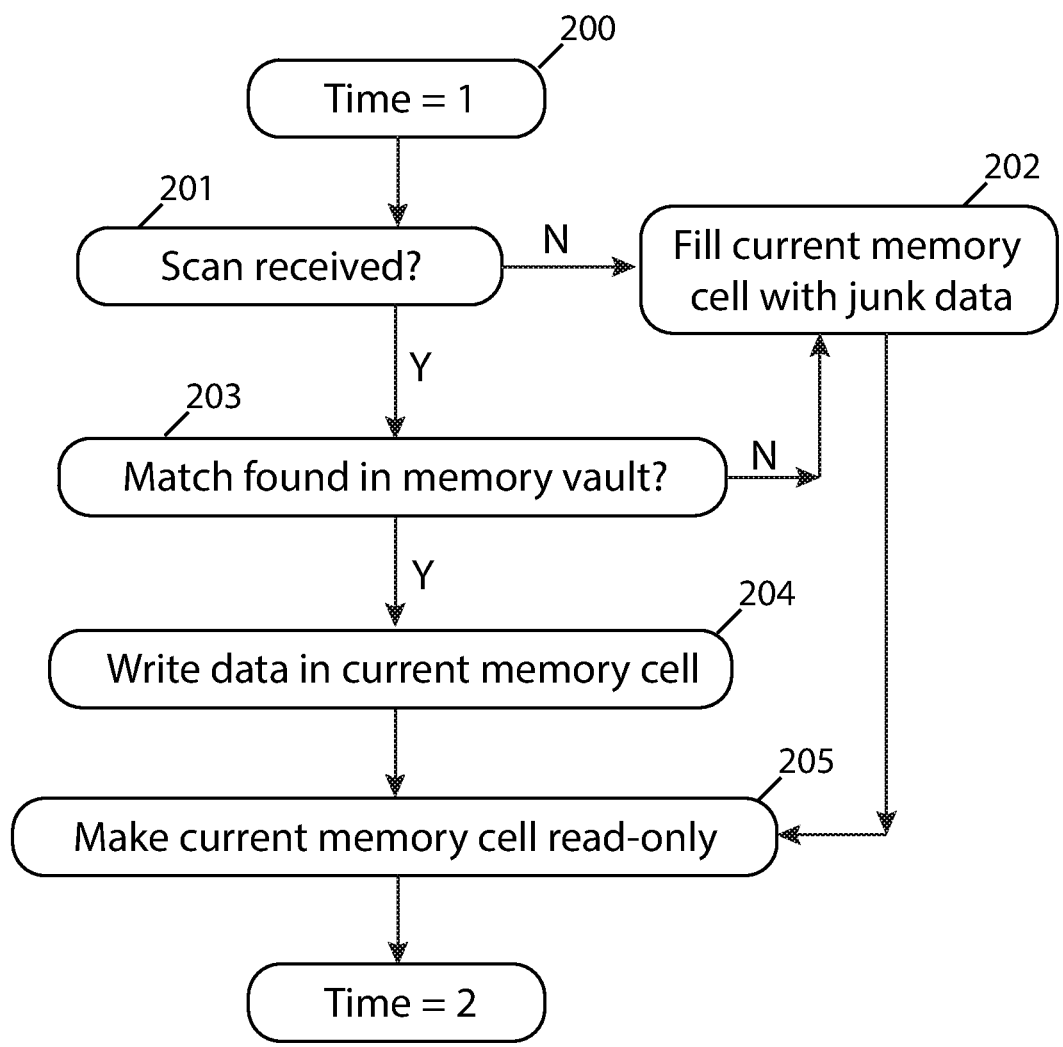
FIG. 2 shows the process for using Time Access Memory (TAM).

Referring to FIG. 2, an embodiment of the process for storing data with Time Access Memory (TAM) is shown. In a first step 200, discrete time is 1. In a next step 201, the system checks for any received biometric scan data. If no biometric scan data is received, the method continues to a next step 202 to fill the current memory cell with junk data or other unusable data. If biometric scan data is received, the method proceeds to a next step 203 to check the received data against stored data for a match. If no match is found, the method proceeds to step 202 to fill the current memory cell with junk data. If a match for the received biometric scan data is found, the method proceeds to a next step 204 to write the biometric scan data in the current memory cell. In a next step 205, the method makes the current memory cell read-only. The process continues in a like manner as discrete time continues. In each discrete time slot, the memory cell filled corresponds to the current discrete time. Once cells are made read-only, they cannot be rewritten, thus making this memory storage system resistant to manipulation.

Figure 3:
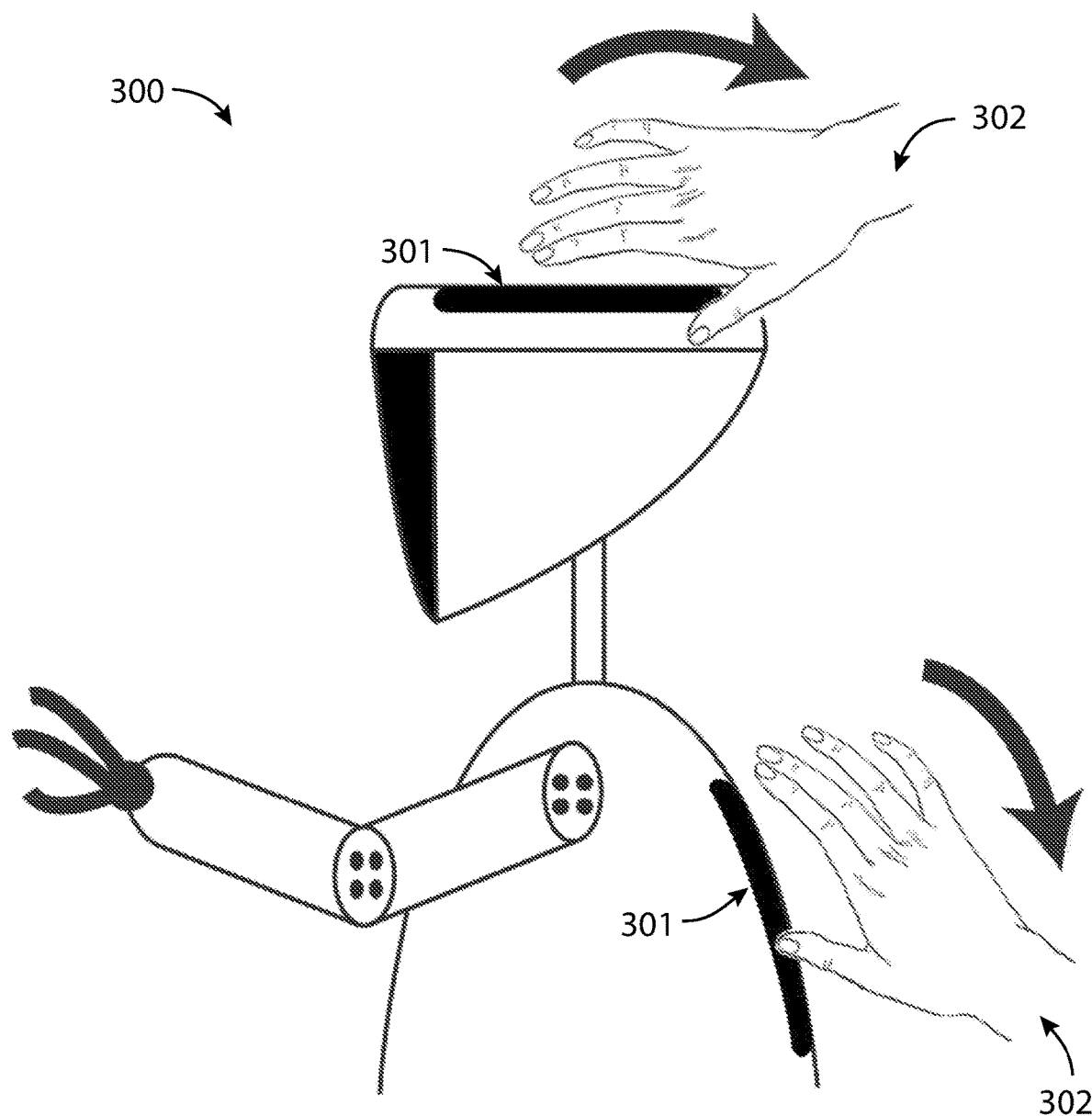
FIG. 3 shows a humanoid robot equipped with the described authentication means.

Referring to FIG. 3, an example of a humanoid robot 300 is illustrated. Two biometric scanners 301 are provided on the robot. The number and positioning of biometric scanners may vary and is not limited. Upon touching either of the biometric scanner surfaces with his or her hand 302, a user provides biometric identification features to sensors within the biometric scanners.

As explained previously, in some embodiments, each time a biometric scan is received and matching biometric data is identified within the saved database, the corresponding user's loyalty metric may be increased by a predetermined amount. A loyalty index stores the loyalty metric of every authorized user. Thus, users' loyalty metrics increase with each authentication, such that, over time, users may achieve a very high loyalty metric. The various functions of the robotic device may be assigned loyalty metric requirements in order to be commanded by users. Users with less than the predetermined amount of loyalty will be unable to execute certain commands. In this way, the most sensitive functions of the robotic device may be controlled only by users with an adequate amount of loyalty. In some embodiments, the loyalty requirements associated with each function may be configured by users during an initial set-up phase.

Referring to FIG. 4, a sample table 400 of loyalty metric requirements for various functions of a robotic device is illustrated. Requirements for functions may be predetermined or configured during an initial set-up phase. Users without less than the required amount of loyalty for any given function will not be permitted to command that function. Any level of loyalty may be assigned to any function without limitation; the table shown is for illustration purposes only.

The system is not limited to humanoid robots, but rather can be implemented in any type of robot. Additionally, the number of users is not limited and be configured during the initial setup. Specialized personnel and/or factory equipment will be required to reset or initialize the related user information data.

In some embodiments, the robotic device receives the biometric scan from a device paired with the robotic device. For example, a user uses a communication device (e.g., mobile device, laptop, remote control, tablet, biometric scanner, etc.) wirelessly paired with the robotic device to perform a biometric scan and the communication device wirelessly transmits the biometric scan to the robotic device and the robotic device proceeds to perform the steps described after receiving the biometric scan.

In some embodiments, the robotic device includes one or more autonomous or semi-autonomous robotic devices including communication, an actuator, mobility, and/or processing components. For example, the robotic device may include a casing (like a shell), a chassis, a set of drive wheels, a suspension system, a motor configured to drive the wheels, a receiver that acquires signals, a transmitter that transmits signals, a processor, a controller, a storage medium, network (e.g., wireless) communications, power management (like a battery), USB ports etc., and one or more clock or synchronizing device. In addition, the robotic device may include a mapping module, localization module, path planning module, user interface module, scheduling module, and various sensors. Examples of sensors include tactile sensors, depth sensors such as LDS, time-of-flight sensors, depth cameras, movement sensors, such as an odometer, inertial measurement units (like with a three-axis accelerometer and a three-axis gyroscope), optical flow sensors (e.g., a visual odometry sensor facing the ground), and other types of sensors useful to the functionality of the robotic device. The list of components presented is not meant to be an exhaustive list of possible components of the robotic device but is rather an example of possible components the robotic device may have. Components and modules may be separate and combined with the main processor of the robotic device or may be integrated within the main processor of the robotic device. Other types of robotic devices with other configurations may also be used.

Figure 5:
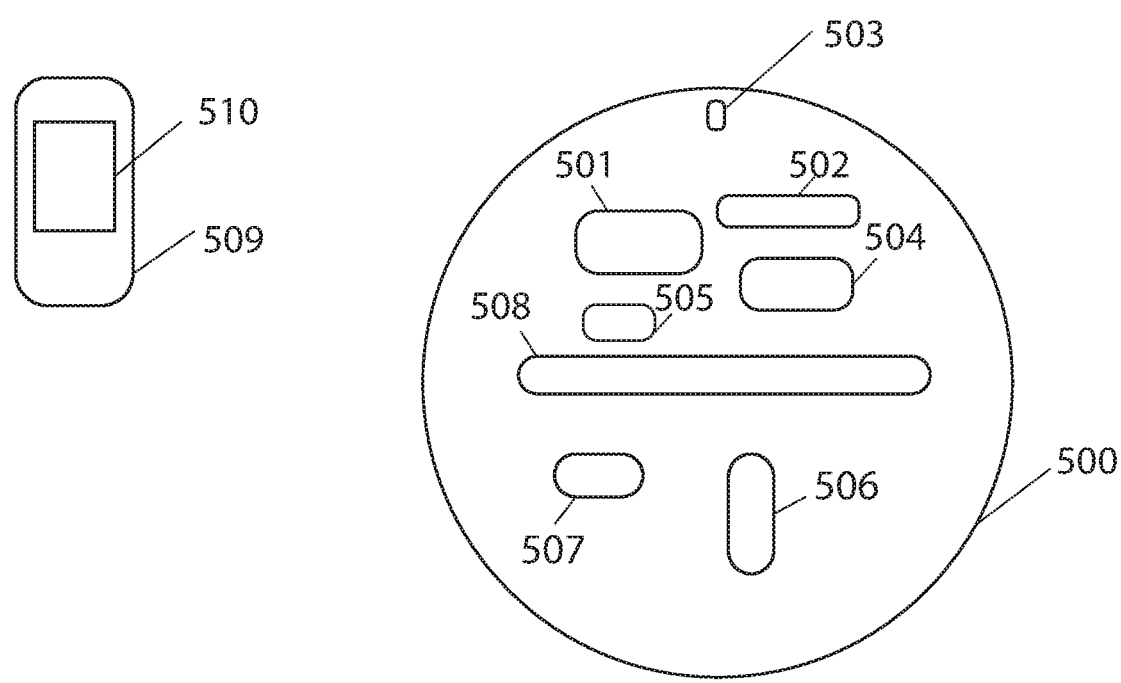
FIG. 5 illustrates an example of a robotic device and communication device that may be used to execute at least some of the techniques described herein in some embodiments.

FIG. 5 illustrates an example of a robotic device 500 with processor 501, memory 502, a first set of sensors 503, second set of sensors 504, network communications 505, movement driver 506, timer 507, and one or more cleaning tools 508. The first and second set of sensors 503 and 504 may include depth measuring devices, movement measuring devices, and the like. In some embodiments, the robotic device may include the features of a robotic device described herein. The shape of the illustrated features is not meant to imply that the robot has a round shape or that any feature has any particular shape. In some embodiments, program code stored in the memory 502 and executed by the processor 501 may effectuate the operations described herein. Some embodiments additionally include communication device 509 having a touchscreen 510 on which an application of the communication device is executed.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted; for example, such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The present techniques will be better understood with reference to the following enumerated embodiments:

1. A method for establishing and maintaining a user loyalty metric to accesses a plurality of robotic device functions comprising: receiving biometric data associated with a user; authenticating the user; providing a time access memory, wherein the time access memory comprises a plurality of memory cells; assigning a predetermined time slot to each of the plurality of memory cells, wherein each of the plurality of memory cells is available for writing only during the predetermined time slot, after which each memory cell is made read-only; storing the biometric data of the user if the user is authenticated within a currently available memory cell of the time access memory; increasing the user loyalty metric if the user is authenticated; and, providing access to the plurality of robotic device functions in accordance with the user loyalty metric.
2. The method of embodiment 1, further comprising: registering the user to the robotic device, the registering comprising: authorizing the user to operate the robotic device; and, establishing an initial user loyalty metric for the user.
3. The method of embodiments 1-2, wherein each of the plurality of robotic device functions are assigned a minimum loyalty metric requirement for access.
4. The method of embodiments 1-3, in which, if the user is not authenticated, junk data is written to the currently available memory cell.
5. The method of embodiments 1-4, wherein the biometric data is selected from the group consisting of: a fingerprint scan, a palm print scan, a hand blood vessel scan, a facial scan, a retinal scan, a voice sample, a hand writing sample, and a DNA sample.
6. The method of embodiments 1-5, wherein the robotic device is limited to receiving no more than a predetermined amount of biometric data in a predetermined period of time.
7. The method of embodiments 1-6, further comprising: encrypting the biometric data of the user stored in the currently available memory cell of the time access memory.
8. The method of embodiments 1-7, wherein the biometric data is received from a mobile device, a laptop, a tablet, a remote control, or a biometric scanner.
9. The method of embodiments 1-8, wherein the plurality of robotic device functions in accordance with different user loyalty metrics is configurable by an authorized user having at least a predetermined loyalty metric.
10. An apparatus, comprising: a robotic device comprising: a chassis; drive wheels coupled to the chassis; one or more processing units; one or more sensors; one or more biometric sensors; a time access memory comprising a plurality of memory cells; and, one or more tangible, non-transitory, machine-readable medium storing instructions that when executed by the one or more processing units effectuate operations comprising: receiving biometric data associated with a user from the one or more biometric scanners; authenticating the user; assigning a predetermined time slot to each of the plurality of memory cells, wherein each of the plurality of memory cells is available for writing only during the predetermined time slot, after which each memory cell is made read-only; storing the biometric data of the user if the user is authenticated within a currently available cell of the time access memory; increasing a user loyalty metric if the user is authenticated; and, providing access to a plurality of robotic device functions in accordance with the user loyalty metric.
11. The apparatus of embodiment 10, further comprising: registering the user to the robotic device, the registering comprising: authorizing the user to operate the robotic device; and, establishing an initial user loyalty metric for the user.
12. The apparatus of embodiments 10-11, wherein each of the plurality of robotic device functions are assigned a minimum loyalty metric requirement for access.
13. The apparatus of embodiments 10-12, in which, if the user is not authenticated, junk data is written to the currently available memory cell.
14. The apparatus of embodiments 10-13, wherein the biometric data is selected from the group consisting of: a fingerprint scan, a palm print scan, a hand blood vessel scan, a facial scan, a retinal scan, a voice sample, a hand writing sample, and a DNA sample.
15. The apparatus of embodiments 10-14, wherein the robotic device is limited to receiving no more than a predetermined amount of biometric data in a predetermined period of time.
16. The apparatus of embodiments 10-15, further comprising: encrypting the biometric data of the user stored in the currently available memory cell of the time access memory.
17. The apparatus of embodiments 10-16, wherein the plurality of robotic device functions in accordance with different user loyalty metrics is configurable by an authorized user having at least a predetermined loyalty metric.
18. One or more tangible, non-transitory, machine-readable medium storing instructions that when executed by one or more processing units effectuate operations comprising: receiving biometric data associated with a user; authenticating the user; providing a time access memory, wherein the time access memory comprises a plurality of memory cells; assigning a predetermined time slot to each of the plurality of memory cells, wherein each of the plurality of memory cells is available for writing only during the predetermined time slot, after which each memory cell is made read-only; storing the biometric data of the user if the user is authenticated within a currently available memory cell of the time access memory; increasing a user loyalty metric if the user is authenticated; and, providing access to a plurality of robotic device functions in accordance with the user loyalty metric.

19. The one or more media of embodiment 18, wherein the biometric data is received from a mobile device, a laptop, a tablet, a remote control, or a biometric scanner.

20. The one or more media of embodiments 18-19, wherein the plurality of robotic device functions in accordance with different user loyalty metrics is configurable by an authorized user having at least a predetermined loyalty metric.

We claim:

1. A method for establishing and maintaining a user loyalty metric to accesses a plurality of robotic device functions comprising:
    receiving biometric data associated with a user;
    authenticating the user;
    providing a time access memory, wherein the time access memory comprises a plurality of memory cells;
    assigning a predetermined time slot to each of the plurality of memory cells, wherein each of the plurality of memory cells is available for writing only during the predetermined time slot, after which each memory cell is made read-only;
    storing the biometric data of the user if the user is authenticated within a currently available memory cell of the time access memory;
    increasing the user loyalty metric if the user is authenticated; and,
    providing access to the plurality of robotic device functions in accordance with the user loyalty metric.

2. The method of claim 1, further comprising:
    registering the user to the robotic device, the registering comprising:
        authorizing the user to operate the robotic device; and,
        establishing an initial user loyalty metric for the user.

3. The method of claim 1, wherein each of the plurality of robotic device functions are assigned a minimum loyalty metric requirement for access.

4. The method of claim 1, in which, if the user is not authenticated, junk data is written to the currently available memory cell.

5. The method of claim 1, wherein the biometric data is selected from the group consisting of: a fingerprint scan, a palm print scan, a hand blood vessel scan, a facial scan, a retinal scan, a voice sample, a hand writing sample, and a DNA sample.

6. The method of claim 1, wherein the robotic device is limited to receiving no more than a predetermined amount of biometric data in a predetermined period of time.

7. The method of claim 1, further comprising:
    encrypting the biometric data of the user stored in the currently available memory cell of the time access memory.

8. The method of claim 1, wherein the biometric data is received from a mobile device, a laptop, a tablet, a remote control, or a biometric scanner.

9. The method of claim 1, wherein the plurality of robotic device functions in accordance with different user loyalty metrics is configurable by an authorized user having at least a predetermined loyalty metric.

10. An apparatus, comprising:
    a robotic device comprising:
        a chassis;
        drive wheels coupled to the chassis;
        one or more processing units;
        one or more sensors;
        one or more biometric sensors;
        a time access memory comprising a plurality of memory cells; and,
        one or more tangible, non-transitory, machine-readable medium storing instructions that when executed by the one or more processing units effectuate operations comprising:
            receiving biometric data associated with a user from the one or more biometric scanners;
            authenticating the user;
            assigning a predetermined time slot to each of the plurality of memory cells, wherein each of the plurality of memory cells is available for writing only during the predetermined time slot, after which each memory cell is made read-only;
            storing the biometric data of the user if the user is authenticated within a currently available cell of the time access memory;
            increasing a user loyalty metric if the user is authenticated; and,
            providing access to a plurality of robotic device functions in accordance with the user loyalty metric.

11. The apparatus of claim 10, further comprising:
    registering the user to the robotic device, the registering comprising:
        authorizing the user to operate the robotic device; and,
        establishing an initial user loyalty metric for the user.

12. The apparatus of claim 10, wherein each of the plurality of robotic device functions are assigned a minimum loyalty metric requirement for access.

13. The apparatus of claim 10, in which, if the user is not authenticated, junk data is written to the currently available memory cell.

14. The apparatus of claim 10, wherein the biometric data is selected from the group consisting of: a fingerprint scan, a palm print scan, a hand blood vessel scan, a facial scan, a retinal scan, a voice sample, a hand writing sample, and a DNA sample.

15. The apparatus of claim 10, wherein the robotic device is limited to receiving no more than a predetermined amount of biometric data in a predetermined period of time.

16. The apparatus of claim 10, further comprising:
    encrypting the biometric data of the user stored in the currently available memory cell of the time access memory.

17. The apparatus of claim 10, wherein the plurality of robotic device functions in accordance with different user loyalty metrics is configurable by an authorized user having at least a predetermined loyalty metric.

18. One or more tangible, non-transitory, machine-readable medium storing instructions that when executed by one or more processing units effectuate operations comprising:
    receiving biometric data associated with a user;
    authenticating the user;
    providing a time access memory, wherein the time access memory comprises a plurality of memory cells;

assigning a predetermined time slot to each of the plurality of memory cells, wherein each of the plurality of memory cells is available for writing only during the predetermined time slot, after which each memory cell is made read-only;

storing the biometric data of the user if the user is authenticated within a currently available memory cell of the time access memory;

increasing a user loyalty metric if the user is authenticated; and, providing access to a plurality of robotic device functions in accordance with the user loyalty metric.

19. The one or more media of claim 18, wherein the biometric data is received from a mobile device, a laptop, a tablet, a remote control, or a biometric scanner.

20. The one or more media of claim 18, wherein the plurality of robotic device functions in accordance with different user loyalty metrics is configurable by an authorized user having at least a predetermined loyalty metric.

\* \* \* \* \*